(12) United States Patent
Cheung

(10) Patent No.: US 6,476,998 B2
(45) Date of Patent: *Nov. 5, 2002

(54) ENHANCED SETTLING CONTROL IN HARD DISK DRIVE

(75) Inventor: Man F. Cheung, Campbell, CA (US)

(73) Assignee: Maxtor Corporation, Longmont, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 62 days.

(21) Appl. No.: 09/192,876

(22) Filed: Nov. 16, 1998

(65) Prior Publication Data

US 2001/0055177 A1 Dec. 27, 2001

(51) Int. Cl.[7] ............................................. G11B 5/596
(52) U.S. Cl. ............................. 360/78.06; 360/78.04
(58) Field of Search ............................ 360/78.04, 75, 360/78.06, 78.07, 78.09; 369/44.35

(56) References Cited

U.S. PATENT DOCUMENTS

| 5,062,023 A | | 10/1991 | Squire | 360/78.04 |
|---|---|---|---|---|
| 5,345,348 A | * | 9/1994 | Suzuki | 360/78.07 |
| 5,459,624 A | * | 10/1995 | Erickson et al. | 360/78.04 X |
| 5,805,374 A | * | 9/1998 | Kasaka | 360/78.04 |
| 5,859,743 A | * | 1/1999 | Kasaka | 360/78.04 |
| 5,940,239 A | * | 8/1999 | Lee et al. | 360/78.09 X |
| 6,046,878 A | * | 4/2000 | Liu et al. | 360/75 |
| 6,118,616 A | * | 12/2000 | Jeong | 360/78.07 |
| 6,166,876 A | * | 12/2000 | Liu | 360/78.04 |
| 6,167,010 A | * | 12/2000 | Shimada et al. | 369/44.35 |

FOREIGN PATENT DOCUMENTS

JP          3-23570       *   1/1991

* cited by examiner

*Primary Examiner*—David Hudspeth
*Assistant Examiner*—Mitchell Slavitt
(74) *Attorney, Agent, or Firm*—David M. Sigmond; Steven G. Roeder; James P. Broder

(57) ABSTRACT

A method for improving servo seek settling performance by selectively activating a gain enhancement control signal during settling. As an actuator approaches a target location, absolute position and velocity of the read/write transducer head are monitored. If the absolute position changes absolute values (positive to negative or vice-versa) or the velocity approaches zero, the gain enhancement control signal is activated and combined with a nominal actuator control signal to further urge the actuator towards the target location. The gain enhancement control signal decays exponentially so as not to excite mechanical resonance of the actuator arms.

47 Claims, 8 Drawing Sheets

ENHANCED SETTLING CONTROL IN HARD DISK DRIVE

BACKGROUND OF THE INVENTION

The present invention relates generally to methods for use in disk drives for computer systems. More particularly, the present invention relates to methods for improving servo seek settling performance by selectively boosting the servo loop bandwidth during settling.

BACKGROUND OF THE INVENTION

FIG. 1 is a diagrammatic representation of a conventional disk drive for use in a host computer system. Disk drive 10 includes at least one rotating rigid disk 14 mounted on a rotating hub 16. The hub 16 is typically secured to a spindle shaft (not shown) that is rotatably mounted to a bearing assembly and driven by a spindle motor. Disk drive 10 also includes an actuator assembly 20 mounted to the baseplate 11. Included in the actuator assembly 20 is a motor assembly 25 (e.g. voice coil motor) that produces a current profile induced torque for pivotably actuating a head actuator 21 about pivot 24 to position a read/write transducer head 19 back and forth between specific tracks 31, 32 concentrically defined on the disk 14. Although not shown it should be understood that actuator assembly 20 may include a plurality of integrated head actuators and read/write transducers to access a plurality of disks.

Each disk 14 includes a plurality of concentric tracks defined thereon for storing data. In addition, each disk 14 may also contain multiple spokes containing servo information that is useful with a head positioner servo system. Head positioner servo systems for disk drives are well known. Disk drive head positioner servos provide essentially two functions: track seeking or accessing, and track following. Ideally, a track seeking servo configuration moves the read/write head between two tracks in the minimum possible time, while track following servo configuration maintains the head at the centerline of a track being followed. These two quite different functions require different control circuit configuration for practical implementation, even though the same actuator structure, actuator driver circuit and mechanical system components are used for both tasks.

A third transitional mode, known as track settle, covers the situation where the track seeking servo has completed its task, and the servo circuitry has switched to the track following configuration, but the head transducer has yet stabilized at the target track location. Since read and write operations cannot be accomplished until the head has stabilized at the target track location, it is most desirable to minimize settle time.

With advancements in disk drive performance, seek times have decreased to approximately 7 msecs. As a result, higher torque levels are also required to effectively move the head positioners to meet the faster access time. A typical current profile 260 for creating such a torque, illustrated in FIG. 2, has a substantially exponential shape, after an initial sudden change of slope. The ruggedness of beginning section 264 signifies an abrupt change in the motor input current which commonly initiates vibration of the disk drive in addition to the desired actuator movement. A "polarity reversal" section 268 of input current profile 260 signifies a transition from acceleration to deceleration. An ending section 272 signifies a final deceleration which causes the actuator to decelerate and eventually return to rest. The deceleration during ending section 272 represents the settling of the read/write head as it approaches the target location. The settling profile on approaching the target location typically entails some sort of ringing induced by an interaction between the drive and the environment. Depending on the drive mounting scheme, the disk drive 10 may also be susceptible to recoil disturbances as a result of the high torque levels generated by the actuator motor. Such recoil forces tend to prevent the read/write head from initially reaching the target location, thereby adversely lengthening the settle time, as illustrated in the FIG. 3 graphical representation. As shown, curve 120 represents the settling time T1, when disk drive is not subjected to recoil. When subjected to recoil, curve 110 never reaches the target location A, at time T1. In fact the recoil will tend to "push" the actuator away from the target location A before finally settling at time T2. Traditionally, the solution to compensate for this recoil was to increase the bandwidth for both the servo settling controller as well as the track following controller. However, mechanical resonance of the head positioners (actuator arms) limit the flexibility to increase servo bandwidth. Another alternative to reducing recoil disturbance was to slow the seek operation. However, this may not be a viable alternative in high TPI and high seek performance disk drive systems where an aggressive seek profile is necessary.

Therefore, there exists a need for a method of improving the settling time to overcome the adverse effects of disk drive recoil during seek operation.

SUMMARY OF THE INVENTION

The present invention satisfies this need.

A general object of the present invention is to improve seek settling performance by selectively activating a momentary gain to servo loop bandwidth during settling.

More specifically, a gain enhancement control signal is selectively activated and combined with a closed loop control signal to provide a momentary boost to servo loop bandwidth when two conditions are satisfied during seek settling.

Another object of the present invention is to provide a disk drive having a controller that urges a read read/write transducer head from an initial location on a disk to a target location and selectively activates an enhanced control signal to further urge the read/write transducer head towards the target location.

In one aspect of the present invention, an absolute position value and a velocity of the read/write head are monitored as the read/write transducer head approaches the target location during a seek. When either the velocity approaches zero or the absolute position value changes signs, a gain enhanced control signal is activated to be combined with the closed loop control signal, and sent to an actuator amplifier to further urge the read/write transducer head towards the target location.

In another aspect of the present invention, the momentary gain activated to produce the gain enhanced control signal decays exponentially so as not to excite mechanical resonance within the drive.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

The present invention will now be described in detail with reference to a few preferred embodiments thereof as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

Figure 1:
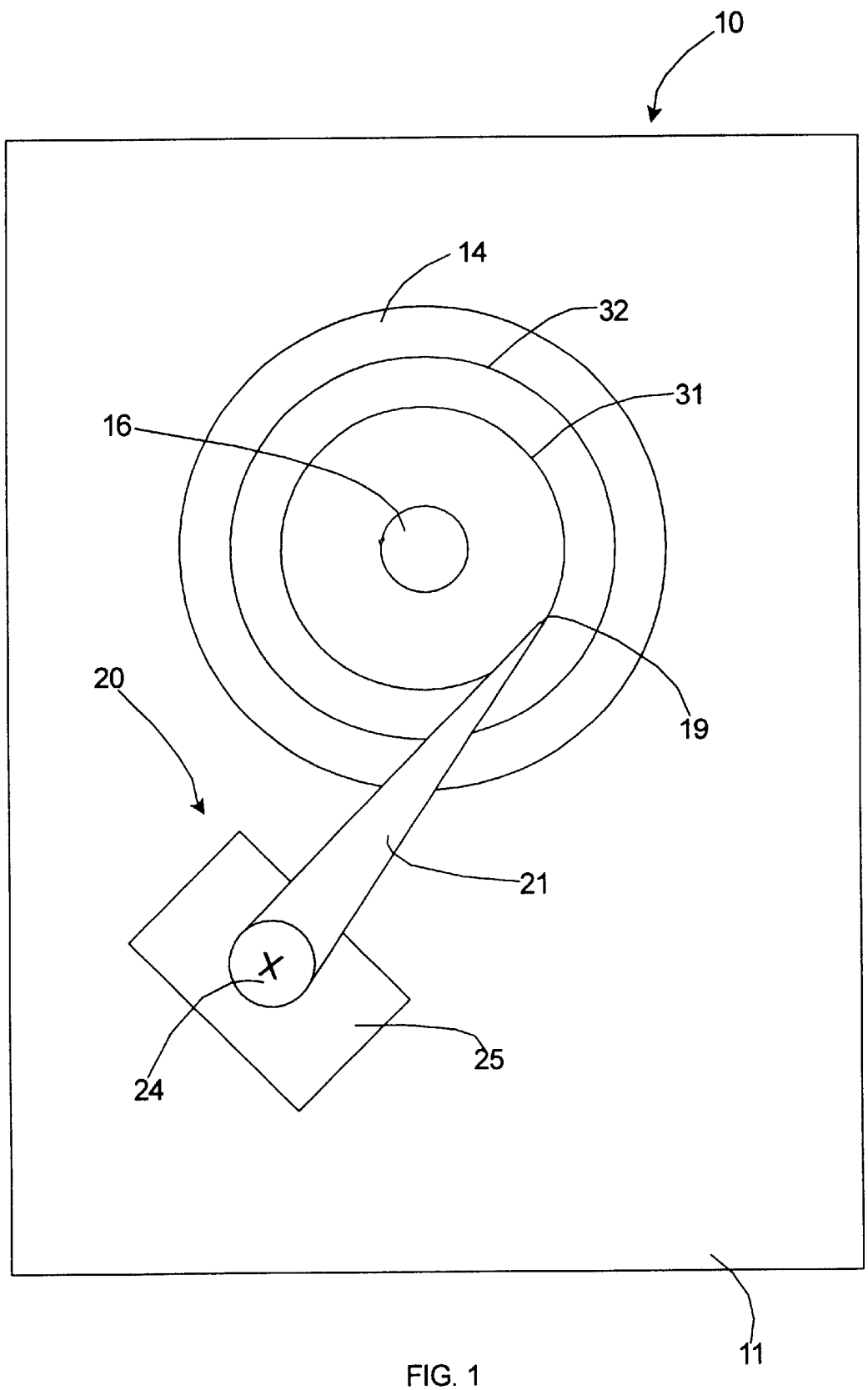
FIG. 1 is a diagrammatic representation of a disk drive assembly.
Figure 2:
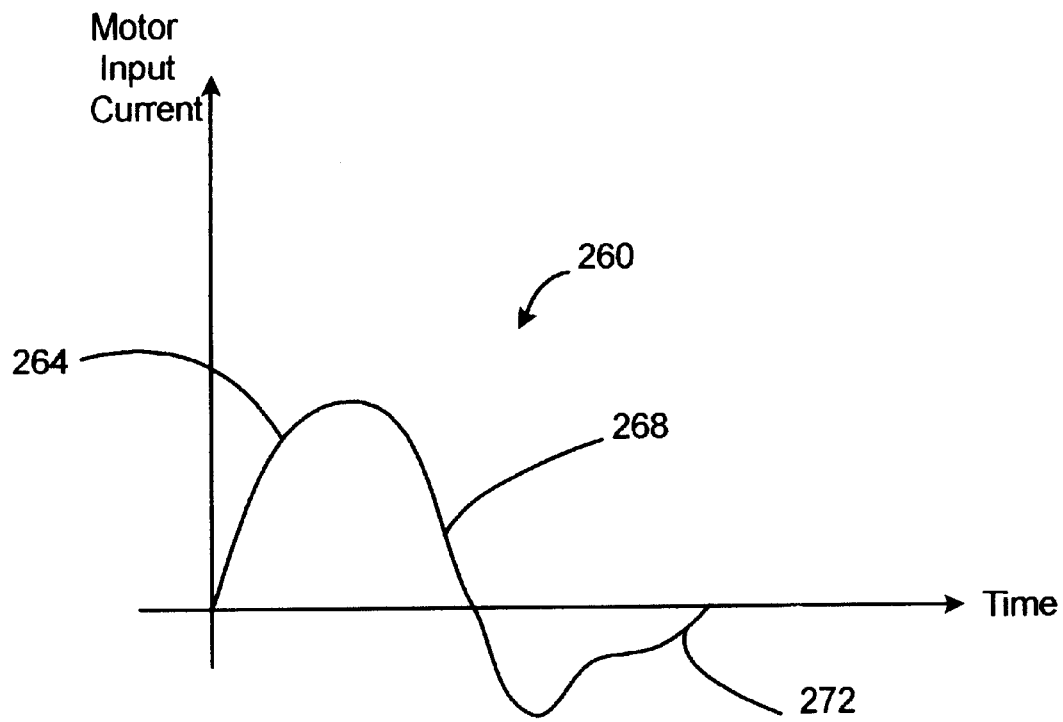
FIG. 2 is a graph representing a current profile for creating torque to accelerate the actuator of FIG. 1.
Figure 3:
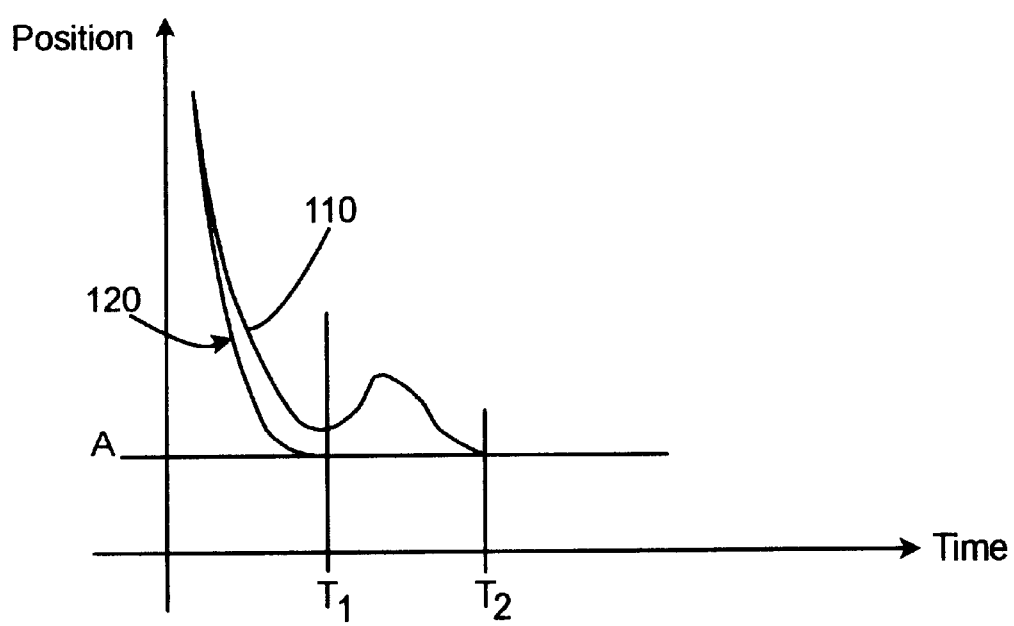
FIG. 3 compares, in graphical form, the effect to settle time when the disk drive is subjected to recoil disturbance induced by acceleration of the actuator.
Figure 4:
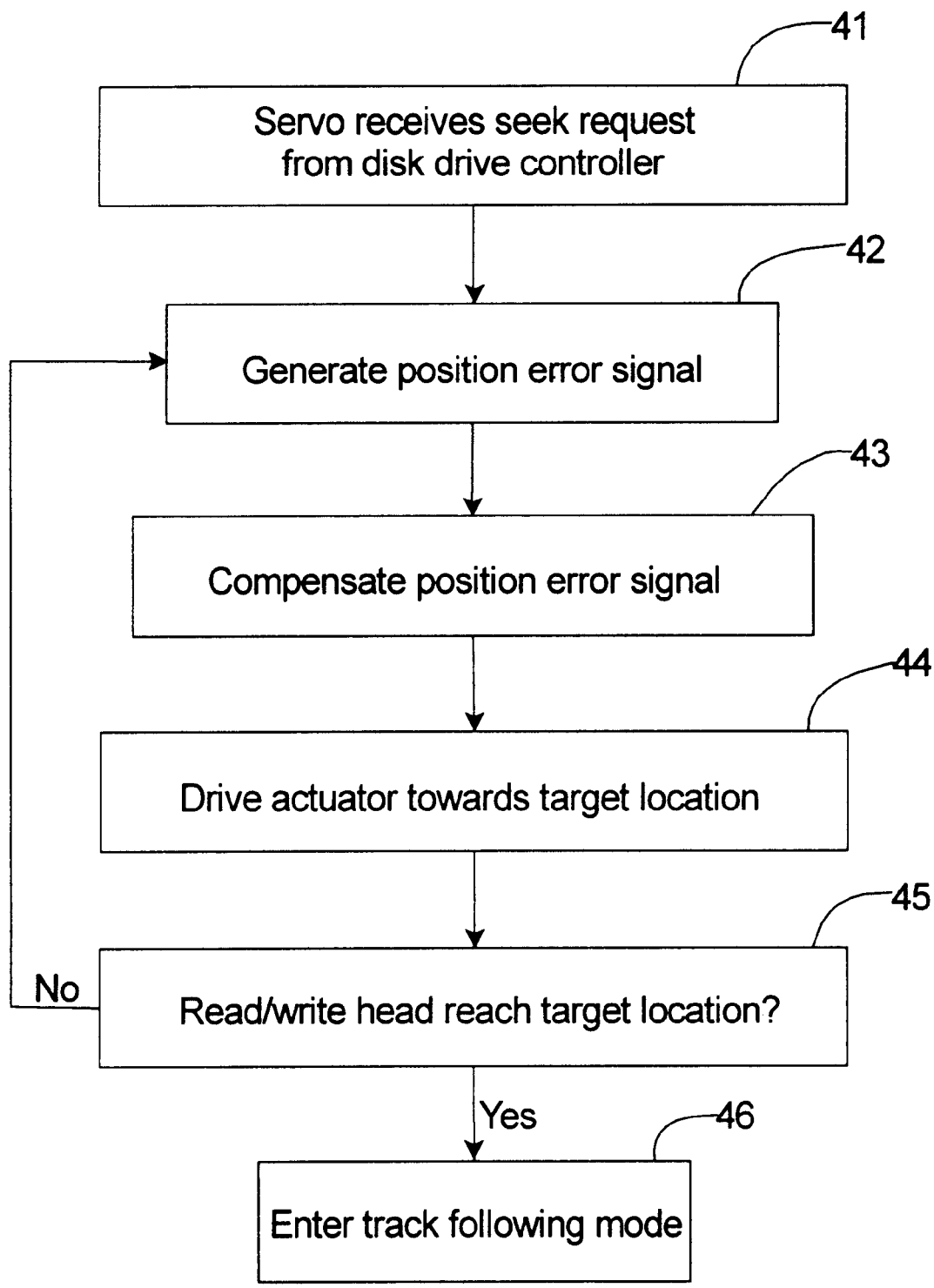
FIG. 4 is a flow diagram representation of a typical closed-loop seek in a disk drive assembly.

The present invention involves the selective increase in bandwidth of a servo seek settling control signal. To begin discussion of the present invention, we first review a typical servo seek scheme, as represented in the flow diagram of FIG. 4. As shown, a seek typically begins at step 41 with the servo system receiving a seek request from the disk drive controller. At step 42, the servo system generates a position error signal. The position error signal is then enhanced at step 43, typically with a signal compensator, producing a closed-loop control signal. The closed-loop control signal is then transmitted to an actuator amplifier to drive the read/write head towards the target location at step 44. At step 45, the servo system determines whether the read/write head has reached the target location. If the read/write head has not reached the target location, a position error signal is again generated, the position error signal is again compensated by the signal compensator, thereby further urging the read/write head towards the target location. This settling loop continues until the target location has been reached, at which point the system enters a track following mode at step 46. As explained herein above, when a disk drive assembly is subjected to recoil disturbance, seek settling time increases due to the additional signal enhancement required to enable the read/write head to reach the target location.

Figure 5A:
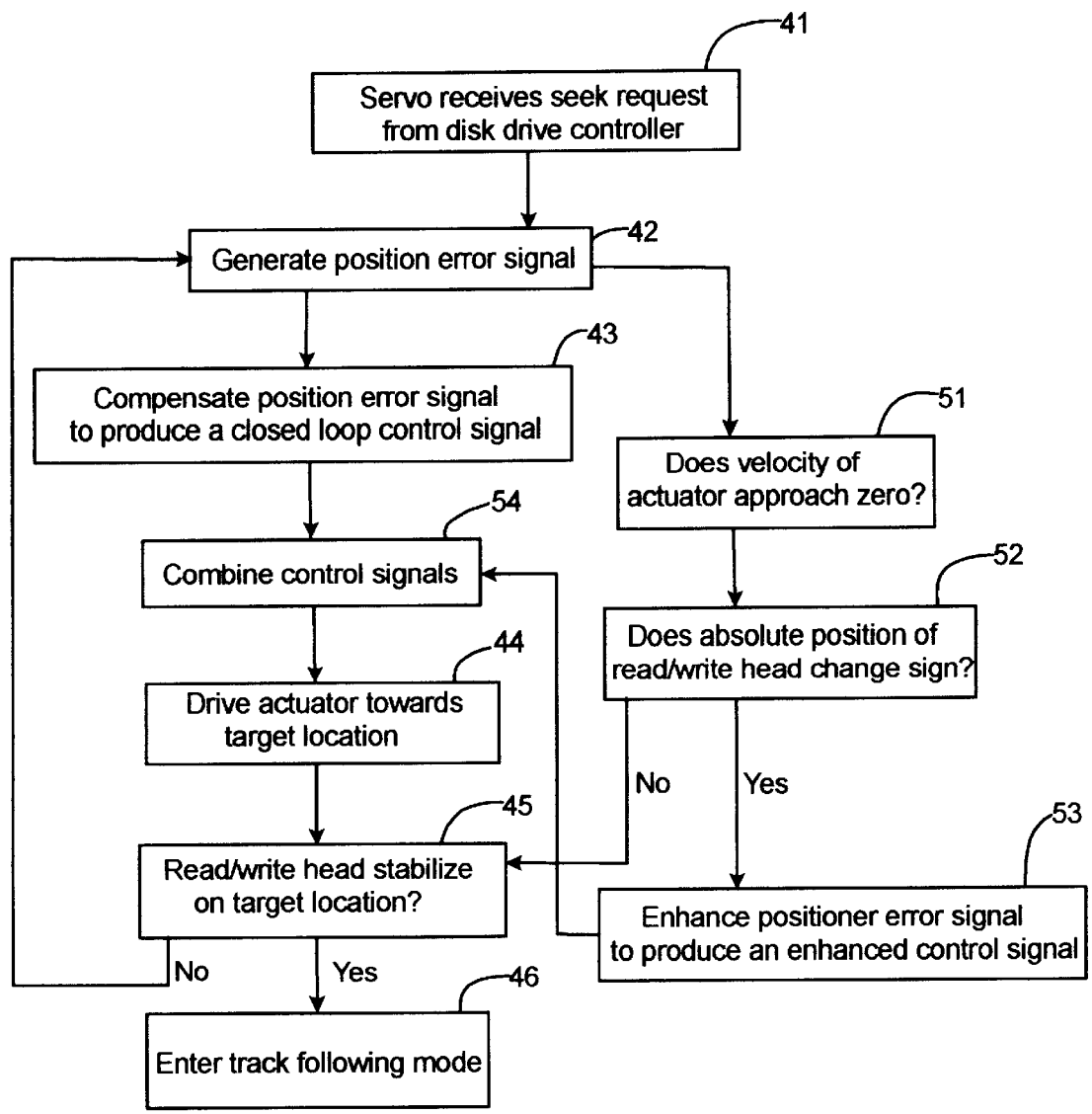
FIG. 5a is a flow diagram representation of an improved closed-loop seek in accordance with principles of the present invention.

Now refer to FIG. 5a, which shows a flow diagram of a servo seek settling scheme in accordance with the present invention. Steps 41–46 are identical to the steps shown in FIG. 4. However, as a position error signal is generated, after the actuator is accelerated towards the target location, the servo system monitors the velocity and absolute position of the re/write head. Absolute position is defined as the relative and directional distance between the readwrite head and the target location as the read/write head approaches the target location. Directional distance may be better understood by referring to FIGS. 6a, 6b, 7a, and 7b, which will be discussed herein below. Thus, absolute position is defined by both a relative direction and a relative distance. When either tho velocity approaches zero, in step 51 or the absolute position changes signs (either negative to positive, or positive to negative), the position error signal is further enhanced by a gain to produce an enhanced control signal as in step 53. The enhanced control signal is then combined with the closed loop control signal in step 54, as the actuator is again urged towards the target location, in step 55. The servo system then determines whether the read/write head has stablized at its target location, i.e. has a velocity that is approximately zero at the target location. If the read/write head has not stabilized at its target location, the system loops back to step 42 to generate a position error signal until the read/write head has stabilized at the target location. if neither of the conditions in steps 51 and 52 is satisfied, the actuator is urged towards the target location with only the closed loop control signal from step 43, as the enhanced control signal in step 53 is not activated. When the read/write head has stabilized at the target location, the system enters the track following mode in step 46.

Figure 5B:
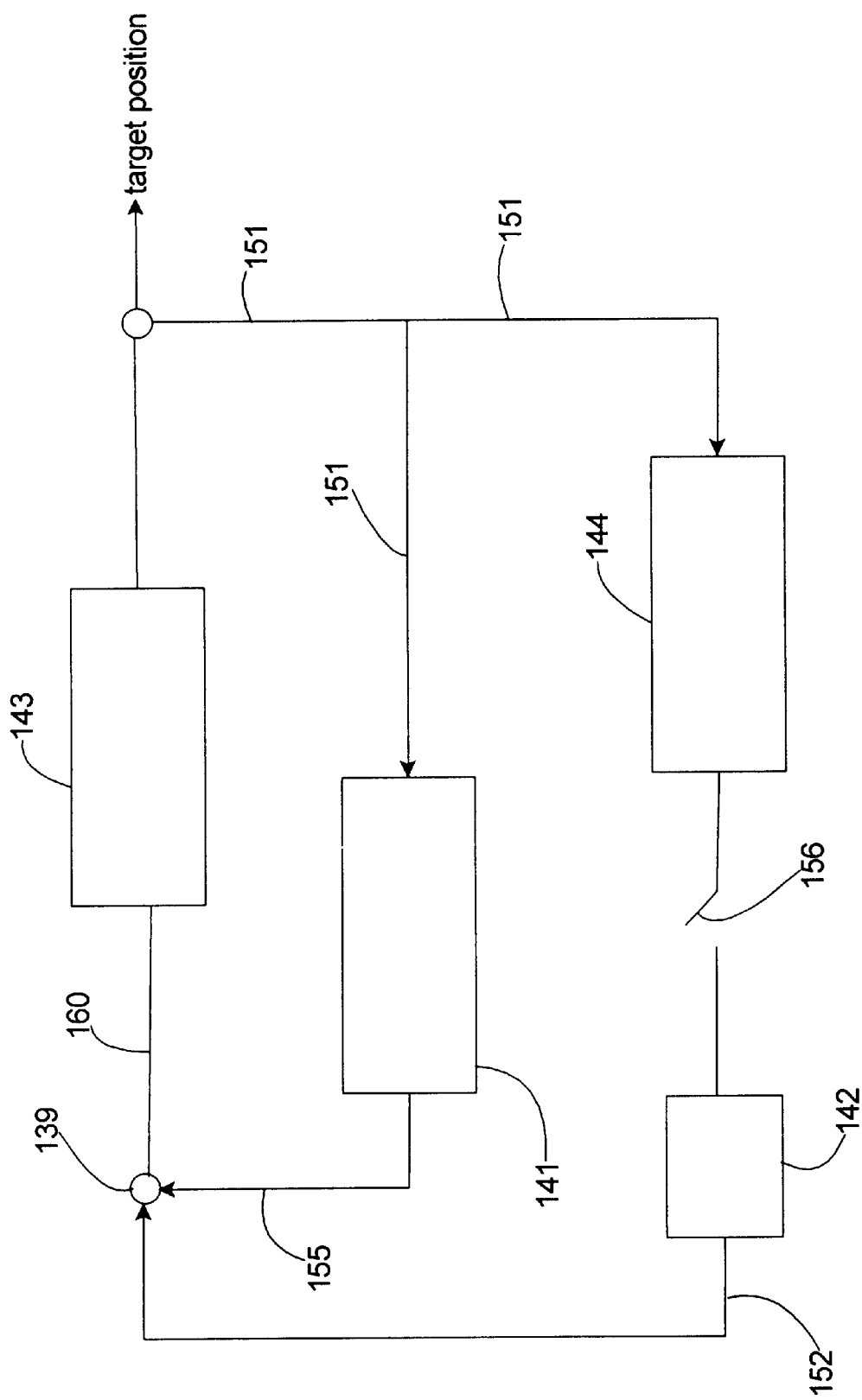
FIG. 5b is a schematic representation of the improved closed-loop seek in accordance with principles of the present invention.
Figure 6A:
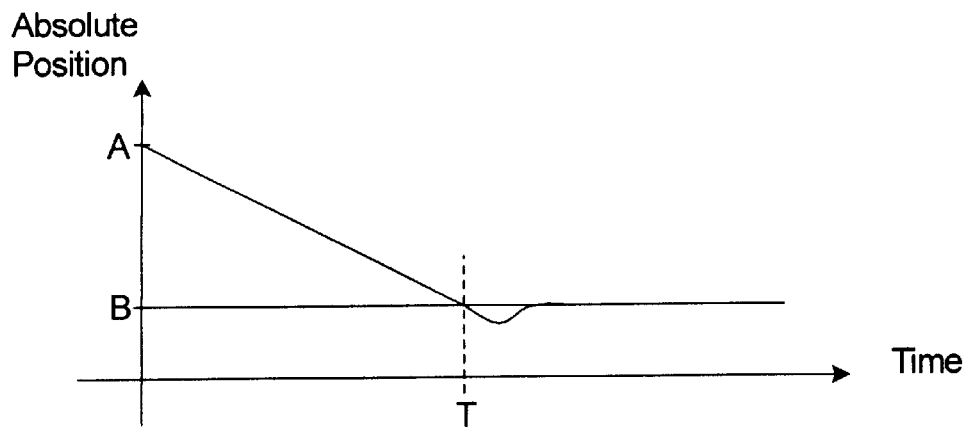
FIG. 6a represents a graph of absolute position of a read/write transducer head over time, during a seek, illustrating one condition when a gain enhancement control signal is activated.
Figure 6B:
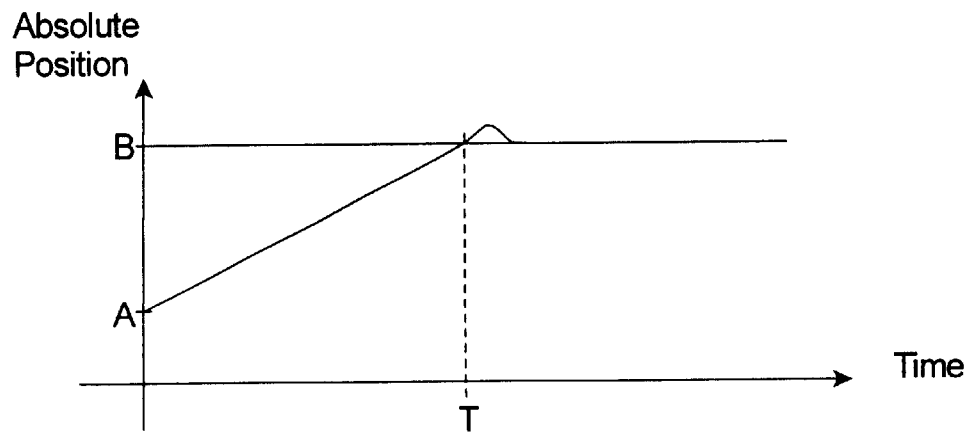
FIG. 6b is a graph of absolute position of the read/write transducer head over time, during a seek, illustrating another condition when a gain enhancement control signal is activated.

To provide further understanding of the present invention, FIG. 5b provides a schematic representation of FIG. 5a. As shown in FIG. 5b, position error signal 151 is provided by servo system 143 and transmitted to both a signal compensator 141 and a decision-making element 144. As position error signal 151 is enhanced by compensator 141, decision making element 144 determines whether either of the two conditions are satisfied i.e. 1) when the absolute position of read/write head relative to the target location changes signs or 2) when read/write head velocity approaches zero. These two conditions are illustrated in FIGS. 6a, 6b, 7a and 7b. FIGS. 6a and 6b illustrate the first condition, when, for example, a recoil of the disk drive forces the read/write head to initially "overshoot" its target location. In FIG. 6a, read/write head starts out from initial location A and accelerates toward target location B in a positive to negative direction. When the read/write head overshoots the target location B, the absolute position changes from a positive value to negative value. Referring back to FIG. 5b, this situation satisfies the first condition, which prompts switch 156 to close, enabling the position error signal 151 to reach gain multiplier 142. Gain multiplier 142 enhances the position error signal 151 to produce enhanced control signal 152, which is then combined with closed loop control signal 155 at adding junction 139.

Figure 6C:
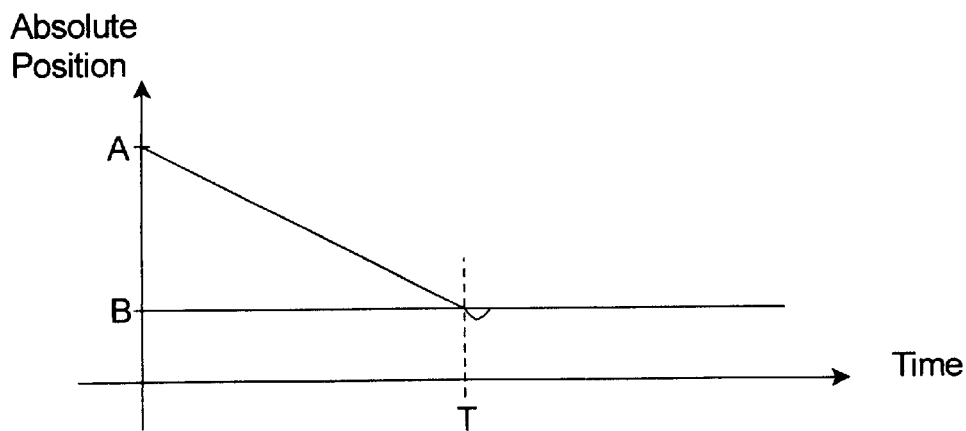
FIG. 6c represent the graph of FIG. 6a when the gain enhancement control signal is applied, in accordance with principles of the present invention.

FIG. 6b illustrates another way of satisfying the first condition. In this situation, the read/write head is accelerated from an initial location A to target location B, in a negative to positive direction. In this scenario, the absolute position changes from a negative to a positive value from the target location. It should be understood that FIGS. 6a and 6b represent the performance of the read/write head when the present invention is not included into the servo system. That is, the read/write head eventually stabilizes on the target location B, but with an extended settling time. As shown in FIG. 6c, which represents FIG. 6a when the present invention is implemented into the servo system, the additional gain reduces settling time by enabling the target location to be stabilized upon at time T.

Figure 7A:
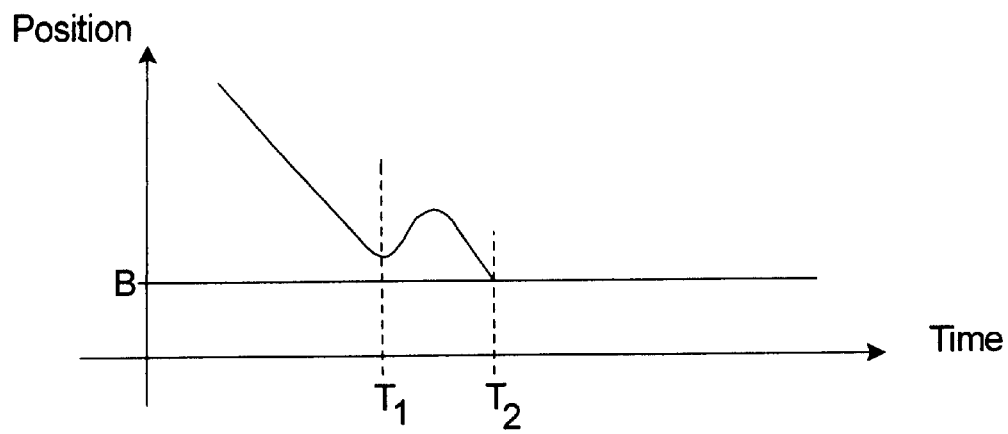
FIG. 7a is a graph of position error of the read/write transducer head over time during a seek, illustrating one condition when a gain enhancement control signal is activated.
Figure 7B:
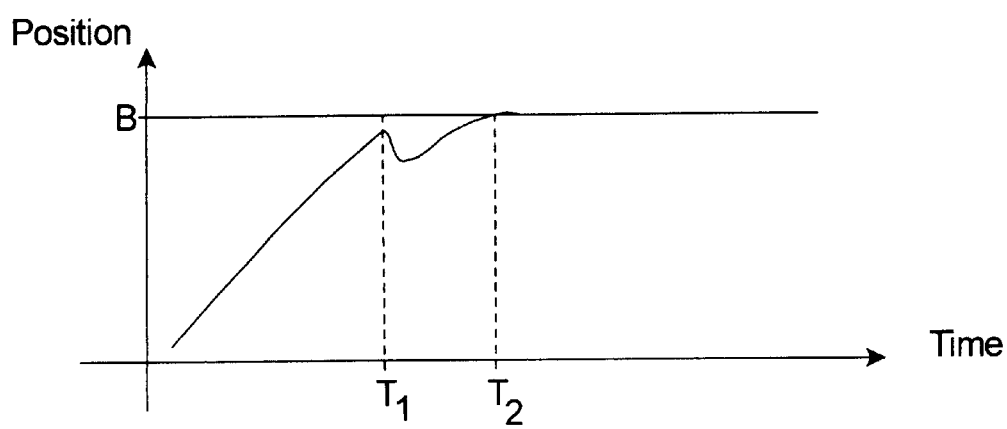
FIG. 7b is a graph of position error of the read/write transducer head over time during a seek, illustrating another condition when a gain enhancement control signal is activated.

FIGS. 7a and 7b illustrate the second aforementioned condition, wherein the read/write head is accelerated towards target location B but does not reach the target location initially, because of, for example, recoil to the disk drive. In FIG. 7a, the read/write head is accelerated towards target location B in a positive to negative direction. At time T1, the read/write head does not reach the target location B as the read/write head changes direction and moves away from target location B. FIG. 7b shows seek acceleration in the opposite direction, i.e. negative to positive wherein the read/write head experiences a similar recoil at time T1 and is initially driven away from the target location B. In both instances, the target location B is reached at time T2.

Figure 7C:
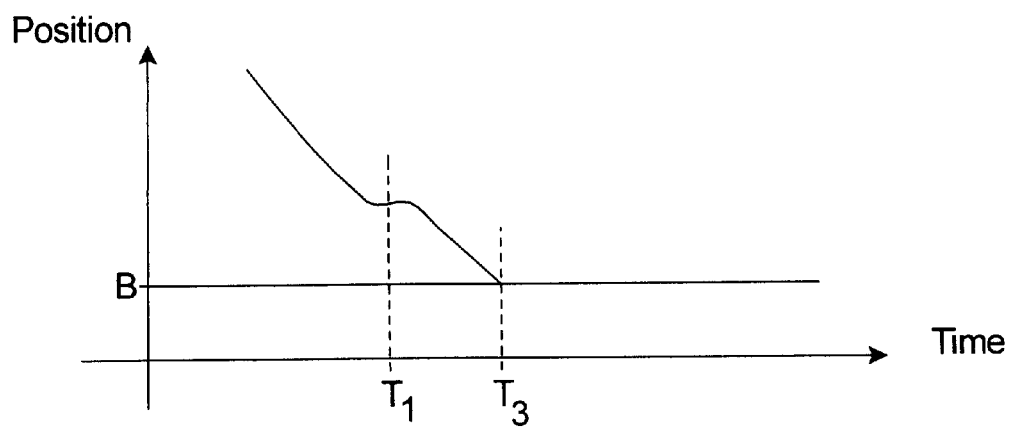
FIG. 7c represent the graph of FIG. 7a when the gain enhancement control signal is applied, in accordance with principles of the present invention.

FIG. 7c illustrates the improved settle time when the present invention is implemented. As recoil similarly is shown to appear at time T1, velocity of the read/write head approaches zero (as the read/write head starts to change direction). A gain is applied to the position error signal to produce an enhanced control signal 152 (see FIG. 5b). The summation of enhanced control signal 152 and closed loop control signal 155 produces combined signal 160 and provides increased bandwidth to further urge the read/write head to reach the target location B at time T3.

Figure 8:
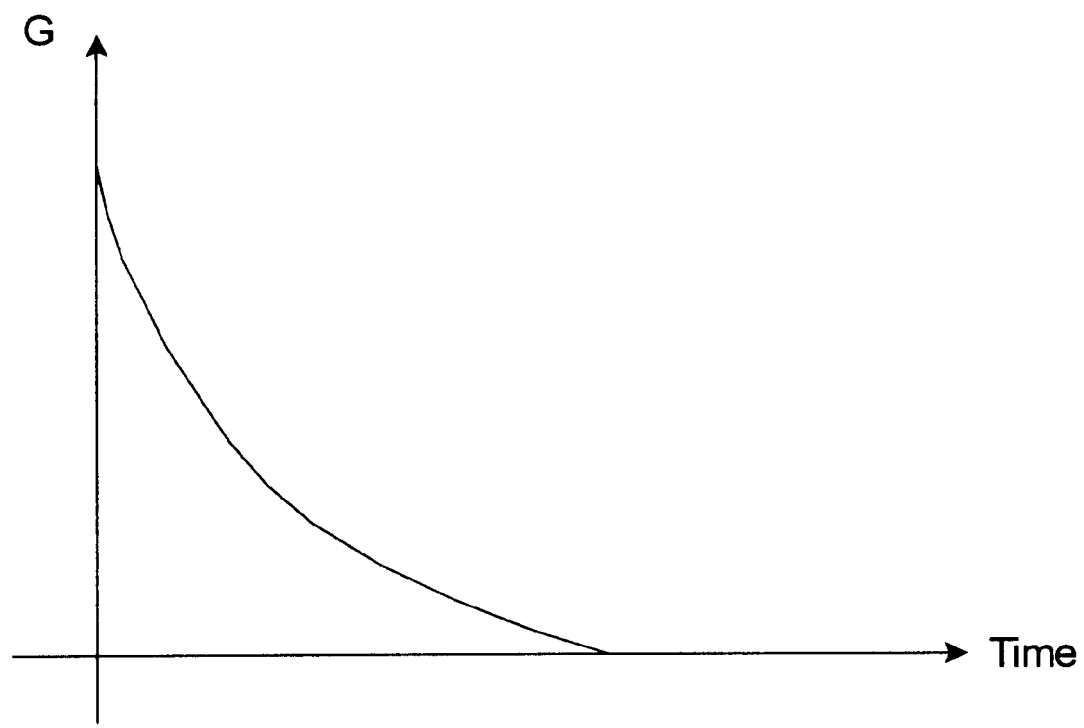
FIG. 8 is a representation of the exponential decay of the gain enhancement control signal in accordance with principles of the present invention.

In accordance with one aspect of the present invention, the gain that is applied to the position error signal, when either of the two aforementioned conditions is satisfied, is one that is not constant in magnitude but rather one that decays exponentially over each digital servo sample. FIG. 8 illustrates this decaying nature, which is necessary in order to prevent possible mechanical resonance in the drive. The exponential decay of gain G may be represented as a function of digital servo sample by the following relationship $$G(k) = G_0 * d^k$$

G=gain
$G_0$=initial gain
k=digital servo sample
d=positive constant where d is less than 1 so that the gain, G, decreases exponentially with each digital servo sample.

Although the present invention has been described to be effective in overcoming the adverse effects of recoil disturbance, those skilled in the art will understand that the present invention is also effective in overcoming adverse effects of other types of disturbances and forces that impede the seek settling time.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method for reducing servo seek settling time in a disk drive apparatus, including an actuator for positioning a read/write transducer head at an initial location and a target location defined on a rotating disk, the method comprising the steps of:

moving the read/write transducer head from the initial location toward the target location with the actuator;

monitoring an absolute position value of the read/write transducer head prior to the read/write transducer head stabilizing at the target location, the absolute position value being defined by either a positive value or a negative value;

selectively activating a gain enhancement control signal when the absolute position value changes between the values; and combining the gain enhancement control signal with a closed loop control signal to further move the read/write transducer head toward the target location, prior to the read/write head stabilizing on the target location.

2. The method of claim 1 further comprising the step of entering a track following mode when the read/write transducer head stabilizes on the target location.

3. A method for reducing servo seek settling time in a disk drive apparatus, including an actuator for positioning a read/write transducer head at an initial location and a target location defined on a rotating disk, the method comprising the steps of:

moving the read/write transducer head from the initial location toward the target location with the actuator;

monitoring an absolute position value of the read/write transducer head prior to the read/write transducer head stabilizing at the target location, the absolute position value being defined by either a positive value or a negative value;

monitoring a velocity of the read/write transducer head prior to the read/write transducer head stabilizing at the target location;

selectively activating a gain enhancement control signal that dissipates exponentially, prior to the read/write transducer head stabilizing at the target location; and combining the gain enhancement control signal with a closed loop control signal to further move the read/write transducer head toward the target location, prior to the read/write head stabilizing on the target location.

4. The method of claim 3 wherein the step of selectively activating a gain enhancement control signal occurs when the absolute position value changes between the values.

5. The method of claim 3 wherein the step of selectively activating a gain enhancement occurs when the velocity of the read/write transducer head approaches zero.

6. The method of claim 3 further comprising the step of sending the combined gain enhancement control signal and the closed loop control signal to an actuator amplifier.

7. The method of claim 3 further comprising the step of entering a track following mode when the read/write transducer head stabilizes on the target location.

8. A method for reducing servo seek settling time in a disk drive apparatus, including an actuator for positioning a read/write transducer head at an initial location and a target location defined on a rotating disk, the method comprising the steps of:

moving the read/write transducer head from the initial location toward the target location with the actuator;

selectively activating a gain enhancement control signal that dissipates exponentially, prior to the read/write transducer head stabilizing at the target location; and combining the gain enhancement control signal with a closed loop control signal to further move the read/write transducer head toward the target location, prior to the read/write head stabilizing on the target location.

9. The method of claim 8 further comprising the step of monitoring an absolute position value of the read/write transducer head prior to the read/write transducer head stabilizing at the target location, the absolute position value being defined by either a positive value or a negative value, and wherein the step of selectively activating a gain enhancement control signal occurs when the absolute position value changes between the values.

10. The method of claim 8 further comprising the step of monitoring a velocity of the read/write transducer head as the read/write transducer head approaches the target location, wherein activation of the gain enhancement control signal occurs when the velocity of the read/write transducer head approaches zero.

11. A disk drive comprising:

a rotatable disk, including an initial track and a target track defined thereon;

a read/write transducer head positioned proximate the rotatable disk;

an actuator assembly that positions the read/write transducer head between an initial location on the initial track and a target location on the target track; and a controller that (i) actuates the actuator assembly to move the read/write transducer head from the initial location toward the target location, (ii) monitors an absolute position value of the read/write transducer head, the absolute position value being defined by either a positive value or a negative value, and (iii) selectively activates a gain enhancement signal when the absolute position value changes between the values to further move the actuator to position the read/write transducer head toward the target location, prior to the read/write transducer head stabilizing on the target location.

12. A disk drive comprising:

a rotatable disk, including an initial track and a target track defined thereon;

a read/write transducer head positioned proximate the rotatable disk;

an actuator assembly for moving the read/write transducer head between an initial location on the initial track and a target location on the target track; and a controller for selectively activating a gain enhancement signal that dissipates exponentially to further move the actuator to position the read/write transducer head toward the target location, prior to the read/write transducer head stabilizing on the target location.

13. The disk drive of claim 12 wherein the controller monitors an absolute position value of the read/write transducer head, and the controller activates the gain enhancement signal when the absolute position value changes from a positive value to a negative value.

14. The disk drive of claim 12 wherein the controller activates the gain enhancement signal when the absolute position value changes from a negative value to a positive value.

15. The disk drive of claim 12 wherein the controller further monitors a velocity of the read/write transducer head as the actuator assembly travels toward the target location.

16. The disk drive of claim 15 wherein the controller activates the gain enhancement signal when the velocity of the read/write transducer head approaches zero.

17. A disk drive comprising:

a rotatable disk, including an initial track and a target track defined thereon; a read/write transducer head positioned proximate the rotatable disk;

an actuator assembly that positions the read/write transducer head to near an initial location on the initial track and a target location on the target track; and a controller that (i) actuates the actuator assembly to move the read/write transducer head from the initial location toward the target location, (ii) monitors a velocity of the read/write transducer head as the actuator assembly travels toward the target location, and (iii) activates a gain enhancement signal when the velocity of the read/write transducer head approaches zero, the gain enhancement signal dissipating exponentially, prior to the read/write transducer head stabilizing on the target location.

18. A method for reducing servo seek settling time in a disk drive apparatus, including an actuator that positions a read/write transducer head at an initial location and stabilizes the read/write transducer head on a target location defined on a rotating disk, the method comprising the steps of:

urging the read/write transducer head from the initial location to the target location with the actuator;

monitoring an absolute position value of the read/write transducer head prior to the read/write transducer head stabilizing at the target location, the absolute position value being defined by either a positive or a negative value;

monitoring a velocity of the read/write transducer head prior to the read/write transducer head stabilizing at the target location;

selectively activating a gain enhancement control signal when the absolute position value changes between the values prior to the read/write transducer head stabilizing at the target location; and combining the gain enhancement control signal with a closed loop control signal to further urge the read/write transducer head toward the target location prior to the read/write transducer head stabilizing at the target location.

19. A servo seek routine for a disk drive, the servo seek routine comprising the steps of:

urging a read/write transducer head from an initial location to a target location with an actuator;

monitoring an absolute position value of the read/write transducer head, the absolute position value of the read/write transducer head being defined by either a positive or a negative value, prior to the read/write transducer head stabilizing at the target location;

monitoring a velocity of the read/write transducer head prior to the read/write transducer head stabilizing at the target location;

selectively activating a gain enhancement control signal when the absolute position value changes between the values prior to the read/write transducer head stabilizing at the target location;

combining the gain enhancement control signal with a closed loop control signal to further urge the read/write transducer head toward the target location prior to the read/write transducer head stabilizing at the target location; and entering a track following mode when the read/write transducer head stabilizes on the target location.

20. A method for reducing servo seek settling time in a disk drive apparatus, including an actuator for urging a read/write transducer head toward a target location defined on a disk, the method comprising the steps of:

moving the read/write transducer head toward the target location, with the actuator; and selectively activating a gain enhancement control signal during movement of the read/write transducer head toward the target location, the gain enhancement control signal dissipating logarthmically.

21. The method of claim 20 further comprising the step of monitoring an absolute position value of the read/write transducer head, the absolute position value being defined by either a positive value or a negative value.

22. The method of claim 21 wherein the step of selectively activating a gain enhancement control signal occurs when the absolute position value changes between the values.

23. The method of claim 20 further comprising the step of monitoring a velocity of the read/write transducer head.

24. The method of claim 23 wherein the step of selectively activating a gain enhancement occurs when the velocity of the read/write transducer head approaches zero.

25. The method of claim 20 wherein the step of selectively activating includes the step of combining the gain enhancement control signal with a closed loop control signal during movement of the read/write transducer head toward the target location.

26. A disk drive comprising:

a disk having a target location defined thereon;

a read/write transducer head positioned proximate the disk;

an actuator assembly that moves the read/write transducer head toward the target location; and a controller that selectively activates a gain enhancement control signal during movement of the read/Write transducer head toward the target location, the gain enhancement control signal dissipating logarithmically.

27. The disk drive of claim 26 wherein the controller monitors an absolute position value of the read/write transducer head, the absolute position value being defined by either a positive or a negative value, and the controller activates the gain enhancement control signal when the absolute position value changes between the values.

28. The disk drive of claim 20 wherein the controller further monitors a velocity of the read/write transducer head as the read/write transducer head travels toward the target location.

29. The disk drive of claim 28 wherein the controller activates the gain enhancement control signal when the velocity of the read/write transducer head approaches zero.

30. A disk drive comprising:

a disk having a target track defined thereon;

a read/write transducer head positioned proximate the disk;

an actuator assembly that moves the read/write transducer head toward the target track; and a controller that (i) monitors a velocity of the read/write transducer head to determine when the velocity is approaching zero, and (ii) selectively activates a gain enhancement control signal upon a determination that the velocity of the read/write transducer head is approaching zero.

31. The disk drive of claim 30 wherein the controller monitors an absolute position value of the read/write transducer head, the absolute position value being defined by either a positive or a negative value, and the controller activates the gain enhancement control signal, when the absolute position value changes between the values.

32. The disk drive of claim 30 wherein the gain enhancement signal dissipates logarithmically.

33. The disk drive of claim 30 wherein the gain enhancement signal dissipates exponentially.

34. A method for reducing servo seek settling time in a disk drive including a storage disk having a target location, the method comprising the steps of:

moving a read/write transducer head toward the target location;

determining when a velocity of the read/write transducer head is approaching zero as the read/write transducer head moves toward the target location; and activating a gain enhancement control signal upon a determination that the velocity of the read/write transducer head is approaching zero, the gain enhancement control signal being used to further move the read/write transducer head toward the target location.

35. The method of claim 34 further comprising the step of combining the gain enhancement control signal with a closed loop control signal during movement of the read/write transducer head toward the target location.

36. The method of claim 34 further comprising the step of sending the combined gain enhancement control signal and the closed loop control signal to an actuator amplifier.

37. The method of claim 34 further comprising the step of entering a track following mode when the read/write transducer head stabilizes on the target location.

38. The method of claim further comprising the step of dissipating the gain enhancement control signal logarithmically.

39. The method of claim 34 further comprising the step of dissipating the gain enhancement control signal exponentially.

40. The method of claim 34 further comprising the step of monitoring an absolute position value of the read/write transducer head, the absolute position value being defined by either a positive value or a negative value.

41. The method of claim 40 further comprising the step of selectively activating a gain enhancement control signal when the absolute position value changes between the values.

42. A method for reducing servo seek settling time in a disk drive apparatus, including an actuator for positioning a read/write transducer head at an initial location and a target location defined on a rotating disk, the method comprising the steps of:

urging the actuator and the read/write transducer head from the initial location to the target location;

monitoring an absolute position value of the read/write transducer head as the read/write transducer head approaches the target location;

monitoring a velocity of the read/write transducer head as the read/write transducer head approaches the target location;

selectively activating a gain enhancement control signal when the absolute position value changes from a negative to a positive value; and combining the gain enhancement control signal with a closed loop control signal to further urge the read/write transducer head toward the target location.

43. The method of claim 42 wherein the gain enhancement control signal is activated when the absolute position value changes from a positive to a negative value.

44. A method for reducing servo seek settling time in a disk drive apparatus, including an actuator for positioning a read/write transducer head at an initial location and a target location defined on a rotating disk, the method comprising the steps of:

urging the actuator and the read/write transducer head from the initial location to the target location;

monitoring an absolute position value of the read/write transducer head as the read/write transducer head approaches the target location;

monitoring a velocity of the read/write transducer head as the read/write transducer head approaches the target location;

selectively activating a gain enhancement control signal, the gain enhancement control signal dissipating exponentially; and combining the gain enhancement control signal with a closed loop control signal to further urge the read/write transducer head toward the target location.

45. A servo seek routine for a disk drive, the servo seek routine comprising the steps of:

urging the actuator and the read/write transducer head from the initial location to the target location;

monitoring an absolute position value of the read/write transducer head as the read/write transducer head approaches the target location;

monitoring a velocity of the read/write transducer head as the read/write transducer head approaches the target location.

selectively activating a gain enhancement control signal when the absolute position value changes from a positive to a negative value;

combining the gain enhancement control signal with a closed loop control signal to further urge the read/write transducer head toward the target location; and entering a track following mode when the read/write transducer head reaches the target location.

46. The method of claim 45 wherein the gain enhancement control signal is activated when the absolute position value changes from a negative to a positive value.

47. A disk drive comprising:

a rotatable disk, including an initial track and a target track defined thereon;

a data transducer positioned proximate the rotatable disk;

an actuator assembly for positioning the data transducer to proximate an initial location on the initial track and a target location on the target track; and a controller for actuating the actuator assembly from the initial location towards the target location and selectively activating a gain enhancement signal to further urge the actuator to position the data transducer towards the target location, the gain enhancement signal dissipates exponentially.

* * * * *

UNITED STATES PATENT AND TRADEMARK OFFICE
CERTIFICATE OF CORRECTION

PATENT NO.    : 6,476,998 B2
DATED         : November 5, 2002
INVENTOR(S)   : Man F. Cheung It is certified that error appears in the above-identified patent and that said Letters Patent is hereby corrected as shown below:

<u>Title page,</u>
Item [74], *Attorney, Agent, or Firm*, please delete -- David M. Sigmond; --.

<u>Column 9,</u>
Line 17, after the term "location" please delete -- , --.
Line 44, please replace the terms "read/Write" with the terms -- read/write --.
Line 56, please replace the number "20" with the number -- 26 --.

<u>Column 10,</u>
Line 41, after the word "claim" please insert the number -- 34 --.

Signed and Sealed this

Fifteenth Day of April, 2003

JAMES E. ROGAN
*Director of the United States Patent and Trademark Office*